(12) United States Patent
Tamane et al.

(10) Patent No.: US 8,729,866 B2
(45) Date of Patent: May 20, 2014

(54) SULFIDE-BASED ALL-SOLID-STATE LITHIUM SECONDARY BATTERY SYSTEM

(75) Inventors: Yasuyuki Tamane, Toyota (JP); Shigenori Hama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 319 days.

(21) Appl. No.: 13/318,423

(22) PCT Filed: Sep. 2, 2009

(86) PCT No.: PCT/JP2009/065325
§ 371 (c)(1),
(2), (4) Date: Nov. 1, 2011

(87) PCT Pub. No.: WO2011/027430
PCT Pub. Date: Mar. 10, 2011

(65) Prior Publication Data
US 2012/0043942 A1    Feb. 23, 2012

(51) Int. Cl.
*H02J 7/00*    (2006.01)
(52) U.S. Cl.
USPC ............................. 320/136; 320/150
(58) Field of Classification Search
USPC ........................................... 320/136
See application file for complete search history.

(56) References Cited

U.S. PATENT DOCUMENTS

| | | | | |
|---|---|---|---|---|
| 6,376,123 | B1 * | 4/2002 | Chu | 429/104 |
| 8,305,044 | B2 * | 11/2012 | Kawamoto et al. | 320/153 |
| 2003/0124419 | A1 | 7/2003 | Ito et al. | |
| 2009/0153104 | A1 * | 6/2009 | Matsuura et al. | 320/153 |
| 2012/0200257 | A1 * | 8/2012 | Schwarz et al. | 320/109 |

FOREIGN PATENT DOCUMENTS

| | | |
|---|---|---|
| JP | 5 6691 | 1/1993 |
| JP | 2002 100411 | 4/2002 |
| JP | 2003 187767 | 7/2003 |
| JP | 2007 141782 | 6/2007 |
| JP | 2008-027826 A | 2/2008 |
| JP | 2008 103245 | 5/2008 |
| JP | 2008 047510 | 12/2008 |

OTHER PUBLICATIONS

International Search Report Issued Nov. 10, 2009 in PCT/JP09/065325 Filed Sep. 2, 2009.

* cited by examiner

*Primary Examiner* — Arun Williams
(74) *Attorney, Agent, or Firm* — Oblon, Spivak, McClelland, Maier & Neustadt, L.L.P.

(57) ABSTRACT

In an all-solid-state lithium secondary battery provided with a sulfide-based electrolyte-containing layer, the production of hydrogen sulfide is effectively inhibited without deteriorating battery characteristics. A battery system (100) is provided with: an all-solid-state lithium secondary battery (1) using a sulfide-based solid electrolyte material; and a reducing device (2, 3, 5) for reducing a charge-discharge amount of the all-solid-state lithium secondary battery if a temperature in an inside of the all-solid-state lithium secondary battery reaches a first threshold value.

17 Claims, 5 Drawing Sheets

SULFIDE-BASED ALL-SOLID-STATE LITHIUM SECONDARY BATTERY SYSTEM

TECHNICAL FIELD

The present invention relates to a system for controlling the operations of an all-solid-state lithium secondary battery provided with an electrolyte-containing layer containing a sulfide-based solid electrolyte material.

BACKGROUND ART

In a commercial lithium secondary battery used in this type of system, an organic electrolyte solution using a combustible organic solvent as a solvent is used. Thus, it is necessary to improve a structure and a material for the installation of a safety device for suppressing an increase in temperature upon short-circuiting and for the prevention of short circuit. Therefore, there has been suggested an all-solid-state lithium secondary battery in which a liquid electrolyte is changed to a solid electrolyte to solidify the entire battery (refer to a patent document 1). In this case, since the combustible organic solvent is not used in the battery, it is considered that the safety device can be simplified and that it is excellent in manufacturing cost and productivity.

However, in the case of the battery using the solid electrolyte material (sulfide-based solid electrolyte material) which is mainly composed of sulfide, there is such a problem that the sulfide-based solid electrolyte material reacts with moisture contained in the air or the like, thereby easily producing hydrogen sulfide. Therefore, the inhibition of the reaction is an essential issue in practical use. Regarding this, the patent document 1 discloses such a technology that the periphery of a battery cell is covered with an alkaline compound for detoxifying or neutralizing a hydrogen sulfide gas and that even if hydrogen sulfide is produced, it is detoxified by the alkaline compound trapping the hydrogen sulfide gas.

PRIOR ART DOCUMENT

Patent Document

Patent document 1: Japanese Patent 1 Application Laid Open No. 2008-103245

DISCLOSURE OF INVENTION

Subject to be Solved by the Invention

However, the provision of a detoxifying substance, which is not limited to an alkaline substance, causes a complicated structure in the battery and increases the size of the battery. Moreover, if the alkaline substance is used as in the patent document 1, it likely corrodes another substance (e.g. battery container) which is in contact with the alkaline substance. That causes a need to separately take measures to prevent the corrosion and further complicates the internal structure of the battery.

Moreover, in the lithium battery, its charge-discharge voltage has a temperature dependence. The lithium battery also has such a problem that it is hardly treated in the same manner as in a high-temperature state; for example, the charge-discharge voltage is significantly lowered in a low-temperature area. In this regard, the patent document 1 does not provide any solution.

In view of the aforementioned problems, it is therefore an object of the present invention to provide an all-solid-state lithium secondary battery provided with a sulfide-based electrolyte-containing layer, capable of effectively preventing the production of hydrogen sulfide.

Means for Solving the Subject

The above object of the present invention can be achieved by a first battery system provided with: an all-solid-state lithium secondary battery using a sulfide-based solid electrolyte material; and a reducing device for reducing a charge-discharge amount of the all-solid-state lithium secondary battery if a temperature in an inside of the all-solid-state lithium secondary battery reaches a first threshold value.

The "all-solid-state lithium secondary battery" of the present invention is an all-solid-state lithium secondary battery provided with an electrolyte (hereinafter referred to as an electrolyte-containing layer, as occasion demands) containing the sulfide-based solid electrolyte material. In the inside of the all-solid-state lithium secondary battery, for example, there is the electrolyte-containing layer containing the sulfide-based solid electrolyte material, and in contact with the air or the like containing moisture, it likely reacts with the moisture and produces hydrogen sulfide. The possibility of producing hydrogen sulfide can be effectively reduced or eliminated by virtue of the reducing device explained below.

Incidentally, in the all-solid-state lithium secondary battery of the present invention, for example, in order that the electrolyte-containing layer is not directly in contact with the air containing moisture or the like even if the all-solid-state lithium secondary battery is damaged or in similar cases, the surface of the electrolyte-containing layer may be protected by an oxide layer or the like formed by oxidizing one portion of the electrolyte-containing layer. In this case, since the presence of the oxide layer can prevent that the electrolyte-containing layer is in direct contact with the air containing moisture, it is possible to reduce or eliminate the possibility of producing hydrogen sulfide, more effectively.

The temperature in the inside of the all-solid-state lithium secondary battery can be monitored via a temperature sensor or the like. The monitoring of the temperature may be performed by a general temperature measurement circuit or the like, which incorporates an element capable of detecting the temperature as a sensor, such as a thermistor and a thermocouple.

The "reducing device" of the present invention reduces the charge-discharge amount of the all-solid-state lithium secondary battery if the temperature in the inside of the all-solid-state lithium secondary battery reaches the first threshold value. Here, the expression "if . . . reaches" means "if . . . becomes equal to or greater than (exceeds)". As described above, the all-solid-state lithium secondary battery has such a characteristic that if the temperature in the inside of the all-solid-state lithium secondary battery increases and if, for example, the sulfide-based solid electrolyte material which exists in the inside of the all-solid-state lithium secondary battery is exposed to high temperatures higher than a predetermined temperature, its composition is changed to a composition in which hydrogen sulfide is easily produced. Thus, by reducing the charge-discharge amount of the all-solid-state lithium secondary battery if the temperature reaches the predetermined temperature (i.e. the first threshold value), it is possible to suppress the increase in temperature of the all-solid-state lithium secondary battery.

In order to effectively prevent the composition change in the sulfide-based solid electrolyte material, for example, the first threshold value is preferably set to be equal to or slightly lower than a temperature at which the composition is changed in the sulfide-based solid electrolyte material contained in the inside of the all-solid-state lithium secondary battery. By setting the first threshold value in this manner, the charge-discharge amount of the all-solid-state lithium secondary battery can be reduced before the temperature of the sulfide-based solid electrolyte material reaches the temperature at which the composition is changed. Thus, it is possible to effectively suppress the increase in temperature of the sulfide-based solid electrolyte material.

Incidentally, the first threshold value can be obtained by various theoretical, experimental, or simulation methods, and it may be stored in a storing device (e.g. a memory) attached to the battery in advance.

As explained above, according to the battery system of the present invention, if the temperature of the sulfide-based solid electrolyte material increases, it is possible to effectively suppress a risk of producing hydrogen sulfide by reducing the charge-discharge amount.

In one aspect of the battery system of the present invention, the reducing device is provided with: a switching device capable of selectively changing ON/OFF of an electrification state in a charge-discharge path of the all-solid-state lithium secondary battery; and a controlling device for controlling the switching device such that the electrification state of the charge-discharge path is OFF if the temperature in the inside of the all-solid-state lithium secondary battery reaches the first threshold value.

The "switching device" in this aspect is a device capable of changing the ON/OFF of the electrification state in the charge-discharge path of the all-solid-state lithium secondary battery. Here, the charge-discharge path means an electrical path to which a voltage and a current charged to or discharged from the battery is applied. The switching device may be an electromagnetic switch capable of physically or directly changing a state between two terminals which are both in a contact state in the steady state in the charge-discharge path, to a non-contact state in predetermined timing. Alternatively, the switching device may be a device capable of indirectly changing the electrification state by stopping the input/output of a circuit for supplying the voltage and the current to the charge-discharge path in predetermined timing. In other words, the aspect of the switching device of the present invention can be arbitrarily selected as long as the switching device can change the ON/OFF of the electrification state in the charge-discharge path.

The "controlling device" of the present invention controls the switching device such that the electrification state of the charge-discharge path is OFF if the temperature in the inside of the all-solid-state lithium secondary battery reaches the first threshold value. The controlling device compares the temperature in the inside of the all-solid-state lithium secondary battery with the first threshold value, thereby controlling the switching device, as occasion demands. For example, if the temperature in the inside of the all-solid-state lithium secondary battery reaches the first threshold value, the controlling device controls the switching device such that the electrification state of the charge-discharge path is OFF. By controlling the switching device in this manner, it is possible to effectively suppress the increase in temperature of the all-solid-state lithium secondary battery.

In one aspect of the battery system of the present invention, it is further provided with a signal outputting device for outputting a predetermined type of notification signal if the temperature in the inside of the all-solid-state lithium secondary battery reaches a second threshold value.

Regarding the notification signal, there is no limit as long as it is a signal outputted when the temperature in the inside of the all-solid-state lithium secondary battery reaches the second threshold value, and for example, it is outputted as an electrical signal. In particular, if the notification signal is the electrical signal, it is possible to make a user visually recognize that the temperature in the inside of the all-solid-state lithium secondary battery reaches the second threshold value by inputting the signal to a Malfunction Indicator Lamp (MIL) lamp capable of lighting up in accordance with the input of the notification signal, and thus, it is extremely practical. In this case, by the user who recognizes the lighting-up of the MIL lamp interrupting or stopping the use of the battery or performing similar things, it is possible to take various measurements, such as minimizing an influence on peripheral equipment or the like to which the all-solid-state lithium secondary battery is connected and manually ending the operations of the all-solid-state lithium secondary battery before toxic hydrogen sulfide is produced from the battery.

Incidentally, the second threshold value can be obtained by various theoretical, experimental, or simulation methods, as in the first threshold value, and it may be stored in a storing device (e.g. a memory) attached to the battery in advance.

In the aspect in which the signal outputting device is provided, as described above, the second threshold value may be set to be higher than the first threshold value.

In this case, the notification signal is outputted if the temperature in the inside of the all-solid-state lithium secondary battery increases and reaches the second threshold value even though the charge-discharge amount of the all-solid-state lithium secondary battery is reduced by the aforementioned reducing device by the fact that the temperature in the inside of the all-solid-state lithium secondary battery reaches the first threshold value. As described above, if the increase in temperature of the all-solid-state lithium secondary battery cannot be suppressed by the reducing device, the signal outputting device can exert the function of notifying the user of the fact.

Moreover, the signal outputting device may keep outputting the notification signal even if the temperature reaches the second threshold value and then the temperature falls below the second threshold value.

In this case, if the temperature in the inside of the all-solid-state lithium secondary battery reaches the second threshold value, even if the temperature falls below the second threshold value after that, the notification signal keeps being outputted without change. In other words, the notification signal outputted in this case means the fact that the temperature in the inside of the all-solid-state lithium secondary battery reached the second threshold value in the past. In particular, in a case where the second threshold value is set, for example, as the temperature at which the composition is changed in the sulfide-based solid electrolyte material contained in the inside of the all-solid-state lithium secondary battery, if the temperature of the sulfide-based solid electrolyte material reaches the second threshold value even once, then, even if the temperature falls below the second threshold value after that, at least the composition is changed in the sulfide-based solid electrolyte material. Even in this case, since the notification signal keeps being outputted, the user can recognize, for example, that it is in a state of easily producing hydrogen sulfide due to the composition change in the sulfide-based solid electrolyte material, depending on whether or not the notification signal is outputted.

In one aspect of the battery system of the present invention, the reducing device reduces the charge-discharge amount by physically cutting a charge-discharge path of the all-solidstate lithium secondary battery if the temperature in the inside of the all-solid-state lithium secondary battery reaches the first threshold value.

In this aspect, the reducing device can reduce the charge-discharge amount by physically cutting the charge-discharge path of the all-solid-state lithium secondary battery. Further to that, the reducing device in this aspect is conceptually different from the aforementioned switching device for switching the electrification state on the charge-discharge path in that the charge-discharge path is physically cut. For example, if the switching device operates, the charge-discharge path is not cut but maintained. Thus, if the switching device does not operate properly, there is not a little possibility that the electrification state of the charge-discharge path is not completely OFF. On the other hand, since the reducing device in this aspect physically cuts the charge-discharge path, it is possible to set the electrification state of the charge-discharge path to be OFF, more certainly, than the case of the switching device.

For the reducing device in this aspect, a device having a characteristic corresponding to the first threshold value as the specification of its part, such as a fuse, may be used.

Incidentally, as in the aspect in which the switching device and the controlling device are provided, as described above, a controlling device for judging operation timing may be separately provided even for the reducing device for physically cutting the charge-discharge path.

Incidentally, the reducing device of the present invention may be provided with: the reducing device including the switching device and the controlling device; and the reducing device for reducing the charge-discharge amount by physically cutting the charge-discharge path of the all-solid-state lithium secondary battery. In other words, the battery system of the present invention may be provided with a plurality of reducing devices having different aspects. In this case, even if the reducing device having one aspect does not operate properly, if the other reducing device operates, then, it is possible to suppress the increase in temperature of the all-solid-state lithium secondary battery, more certainly. Moreover, if the reducing devices are constructed of the plurality of devices as described above, the operation timing of the reducing device for physically cutting the charge-discharge path of the all-solid-state lithium secondary battery may be set to be delayed in comparison with the other device. If the charge-discharge path is physically cut, in a case where the all-solid-state lithium secondary battery is used again later, the user is forced to perform an operation of restoring or repairing the cut charge-discharge path. In other words, if it is expected to cut the charge-discharge path by using the other device which will not force the user to perform the restoring operation later, the restoring operation imposes an unnecessary burden on the user, which is very inefficient. Thus, firstly, it is tried to cut the charge-discharge path by using the other device, and if the cut cannot be achieved, then, the device for physically cutting the charge-discharge path of the all-solid-state lithium secondary battery is operated, by which the charge-discharge path can be set to be OFF, more certainly, while reducing the user's burden.

In another aspect of the battery system of the present invention, the temperature in the inside of the all-solid-state lithium secondary battery is a temperature of the sulfide-based solid electrolyte material.

The sulfide-based solid electrolyte material may contain at least one of sulfur, lithium, boron, silicon, germanium, phosphorus, and aluminum. Preferably, the sulfide-based solid electrolyte material may be $Li_2S$—$P_2S_5$-based glass ceramics. $Li_2S$—$P_2S_5$ easily produces hydrogen sulfide due to the composition change if it is heated above a certain temperature. Thus, by suppressing the increase in temperature in preferable timing by virtue of the reducing device, it is possible to effectively reduce or eliminate the possibility of producing hydrogen sulfide.

Moreover, in this case, the aforementioned $Li_2S$—$P_2S_5$-based glass ceramics may have a $Li_2S$ content of 75 mol %. According to the study of the present inventors, it is found that if the $Li_2S$—$P_2S_5$-based glass ceramics are used as the sulfide-based solid electrolyte material in the inside of the all-solid-state lithium secondary battery, it is possible to extremely effectively suppress the possibility of producing hydrogen sulfide when the electrolyte-containing layer is in contact with moisture contained in the air in a case where the $Li_2S$ content is set to be 75 mol %. The detailed experimental data will be detailed later, but if the $Li_2S$ content is set to be 75 mol % the amount of hydrogen sulfide produced can be inhibited up to about $\frac{1}{50}$ in comparison with the case where the $Li_2S$ content is set to be 70 mol %. Therefore, by establishing the battery system from the all-solid-state lithium secondary battery using the sulfide-based solid electrolyte material having such $Li_2S$ content, even if the sulfide-based solid electrolyte material is in contact with moisture contained in the air for some reasons, it is possible to suppress the possibility of producing hydrogen sulfide.

Incidentally, if the $Li_2S$—$P_2S_5$-based glass ceramics are used as the sulfide-based solid electrolyte material, the first threshold value may be set to correspond to a temperature of 290 degrees C. According to the study of the present inventors, the amount of hydrogen sulfide produced in the exposure to moisture in the air or the like decreases due to the heat treatment of the $Li_2S$—$P_2S_5$-based glass ceramics in comparison with a case where the heat treatment is not performed. Moreover, it is also found that heating the $Li_2S$—$P_2S_5$-based glass ceramics above 290 degrees C. causes the composition change and increases the amount of hydrogen sulfide produced. Thus, by setting the first threshold value to 290 degrees C. at which the composition is changed, it is possible to operate the reducing device in proper timing.

The operation and other advantages of the present invention will become more apparent from the embodiment explained below.

MODE FOR CARRYING OUT THE INVENTION

Hereinafter, a preferred embodiment of the present invention will be explained with reference to the drawings.

<1: Configuration of Embodiment>

Figure 1:
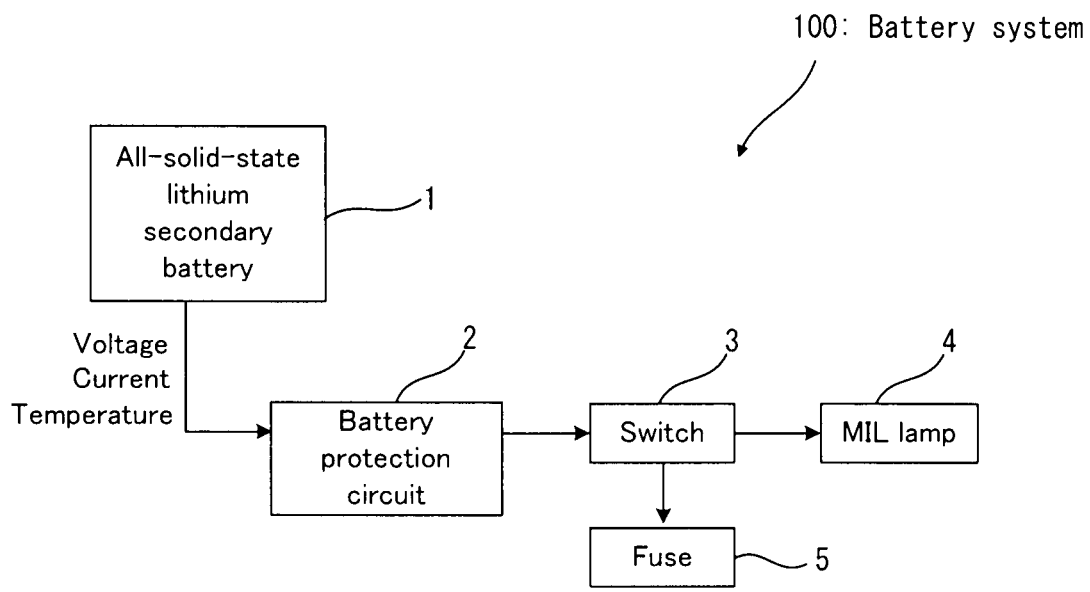
FIG. 1 is a schematic configuration diagram conceptually showing the configuration of a battery system in an embodiment.

Firstly, with reference to FIG. 1, the configuration of a battery system 100 in the embodiment of the present invention will be explained. FIG. 1 is a schematic configuration diagram conceptually showing the configuration of the battery system 100 in the embodiment.

In FIG. 1, the battery system 100 is one example of the "battery system" of the present invention, provided with an all-solid-state lithium secondary battery 1, a battery protection circuit 2, a switch 3, a Malfunction Indicator Lamp (MIL) lamp 4, and a fuse 5.

The battery protection circuit 2 is an electronic circuit including a temperature detection circuit for detecting the temperature of the all-solid-state lithium secondary battery 1, and it functions as the "reducing device" of the present invention together with the switch 3. The battery protection circuit 2 can control the switch 3 disposed in a charge-discharge path of the all-solid-state lithium secondary battery 1, on the basis of the detected temperature.

The switch 3 is an electromagnetic switch capable of physically and directly changing a state between two terminals which are both in a contact state in the steady state, to a non-contact state in predetermined timing, in the charge-discharge path to which a voltage and a current charged or discharged by the all-solid-state lithium secondary battery 1 are applied. The switch 3 is configured to change the ON/OFF of an electrification state in the charge-discharge path. In other words, in the switch 3, in the steady state (i.e. in a state in which the all-solid-state lithium secondary battery 1 is normal), the two terminals on the charge-discharge path are in contact so as to short-circuit them. However, by releasing the contact state between the two terminals in the predetermined timing specified by the battery protection circuit 2, it is possible to make the charge-discharge path in a non-electrification state (i.e. the electrification state is OFF).

The switch 3 functions as one example of the aforementioned switching device. In this case, the battery protection circuit 2 functions as the aforementioned controlling device. The battery protection circuit 2 controls the switch 3 such that the electrification state of the charge-discharge path of the all-solid-state lithium secondary battery 1 is OFF if it is judged that there is the possibility of a composition change due to an increase in temperature of an electrolyte-containing layer containing sulfide of the all-solid-state lithium secondary battery 1. The specific control contents will be detailed later.

Figure 2:
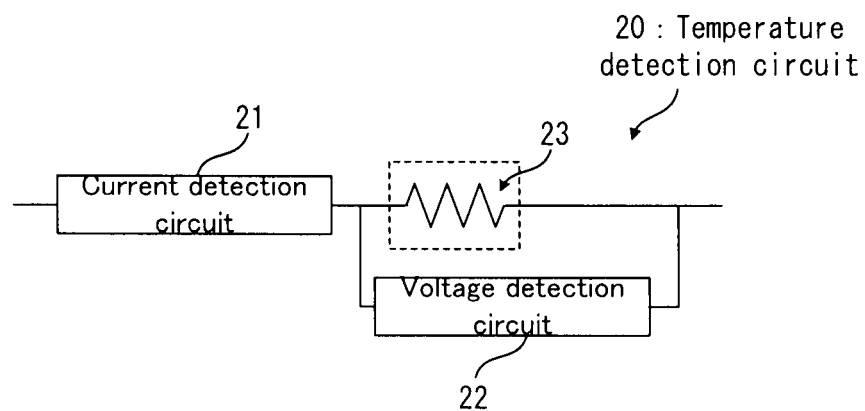
FIG. 2 is a block diagram showing a temperature detection circuit provided for a battery protection circuit of the battery system in the embodiment.

Now, with reference to FIG. 2, the specific structure of a temperature detection circuit 20 provided for the battery protection circuit 2 will be explained. FIG. 2 is a block diagram showing the temperature detection circuit 20 provided for the battery protection circuit 2 of the battery system in the embodiment.

The temperature detection circuit 2 includes a current detection circuit 21, a voltage detection circuit 22, and a thermistor element 23. The thermistor element 23 is disposed to be in direct or indirect contact with the electrolyte-containing layer of the all-solid-state lithium secondary battery 1 in the battery system 100, thereby measuring the temperature of the all-solid-state lithium secondary battery 1. Incidentally, the temperature detection circuit using the thermistor element is detailed in the embodiment; however, other various elements used for temperature detection, such as a thermocouple, may be also used to constitute the temperature detection circuit.

The thermistor element 23 is a thermistor element which is a type of resistor in which an electrical resistance value has a temperature dependence. Incidentally, the thermistor element 23 may be of a PTC type, NTC type, or CTR type.

The current detection circuit 21 is inserted in series with the thermistor element 23, thereby measuring the magnitude of an electric current flowing in the thermistor element 23. On the other hand, the voltage detection circuit 22 is inserted in parallel with the thermistor element 23, thereby measuring a potential difference between both ends of the thermistor element 23.

By virtue of the current detection circuit 21 and the voltage detection circuit 22 disposed in this manner, the values of the current and voltage applied to the thermistor element 23 can be measured. Thus, it is possible to calculate the electrical resistance value of the thermistor element 23. Since the electrical resistance value of the thermistor element 23 has a temperature dependence, the temperature of the all-solid-stage lithium secondary battery 1 can be detected from the calculated electric resistance value, with reference to a map or the like corresponding to temperature-electric resistance characteristics about the thermistor element 23 recorded in a storing device such as a memory in advance.

Back in FIG. 1 again, the MIL lamp 4 is a lamp for notifying a user of the possibility of the composition change in the electrolyte-containing layer by lighting up if the aforementioned notification signal is outputted from the battery protection circuit 2. In the embodiment, the notification signal is outputted as a voltage signal from the temperature detection circuit 2 in predetermined timing, and the voltage signal is applied to the MIL lamp 4, so that the MIL lamp 4 lights up. The electrolyte-containing layer of the all-solid-stage lithium secondary battery 1 contains sulfide, and if its temperature exceeds a predetermined value, the composition is changed. By reaction with moisture contained in the air or the like, is hydrogen sulfide is easily produced. The predetermined value in the embodiment is set, for example, to the same value as a temperature at which the electrolyte of the all-solid-stage lithium secondary battery 1 causes the composition change. As a result, by lighting up the MIL lamp 4 in a case where the temperature of the all-solid-stage lithium secondary battery 1 detected by the battery protection circuit 2 exceeds the predetermined value, it is possible to notify the user of the composition change in the electrolyte. Thus, the user who recognizes the lighting-up of the MIL lamp 4 can take measures, such as maintaining the battery system 100 in a preferable state, by replacing the all-solid-stage lithium secondary battery 1 with a new one or by performing similar things.

The fuse 5 is a temperature fuse inserted in the charge-discharge path of the all-solid-stage lithium secondary battery 1, and it functions as one example of the "reducing device" of the present invention as in the battery protection circuit 2 and the switch 3 described above. The fuse 5 in the embodiment is a temperature fuse and is configured to physically cut the charge-discharge path of the all-solid-stage lithium secondary battery 1 when the temperature of the all-solid-stage lithium secondary battery 1 reaches the predetermined value. In other words, in the point of physically cutting the charge-discharge path, the fuse 5 has a difference from the battery protection circuit 2 and the switch 3 described above for switching the electrification state on the charge-discharge path. In other words, the battery system 100 in the embodiment has the two types of devices, which are the switch 3 capable of changing the ON/OFF of the charge-discharge path and the fuse 5 capable of physically cutting the charge-discharge path, as the reducing device of the present invention.

Figure 3:
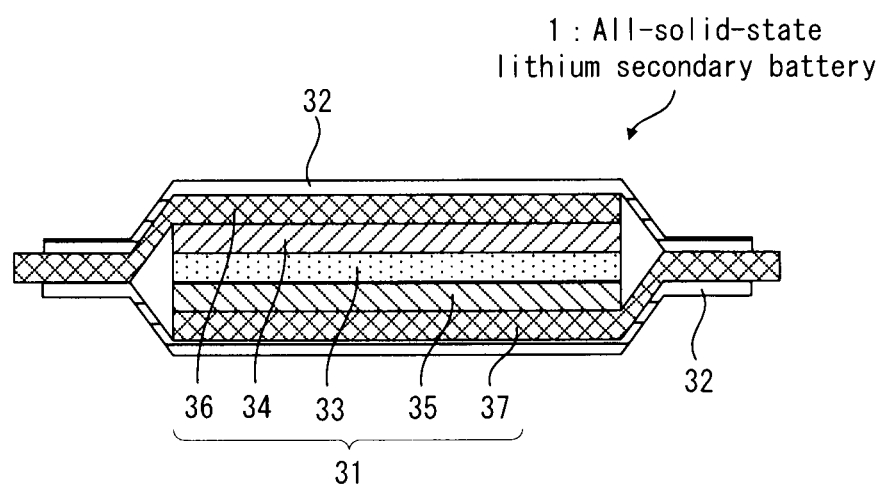
FIG. 3 is a schematic diagram showing the cross section structure of an all-solid-state lithium secondary battery provided for the battery system in the embodiment.

Next, with reference to FIG. 3, the structure of the all-solid-stage lithium secondary battery 1 will be explained in detail. FIG. 3 is a schematic diagram showing the cross section structure of the all-solid-state lithium secondary battery 1 provided for the battery system in the embodiment.

The all-solid-stage lithium secondary battery 1 has such a shape that a power generation element 31 is covered by a battery case 32.

The power generation element 31 is provided with: a solid electrolyte layer 33; a positive electrode layer 34 disposed on one surface of the solid electrolyte layer 33; a negative electrode layer 35 disposed on the other surface of the solid electrolyte layer 33; a positive electrode current collector 36 disposed opposite to the solid electrolyte layer 33 side of the positive electrode layer 34; and a negative electrode current collector 37 disposed opposite to the solid electrolyte layer 33 side of the negative electrode layer 35. Each of the solid electrolyte layer 33, the positive electrode layer 34, and the negative electrode layer 35 is formed as the electrolyte-containing layer containing the sulfide-based solid electrolyte material, in order to improve $Li^+$ ion conductivity in the power generation element 31.

Figure 4:
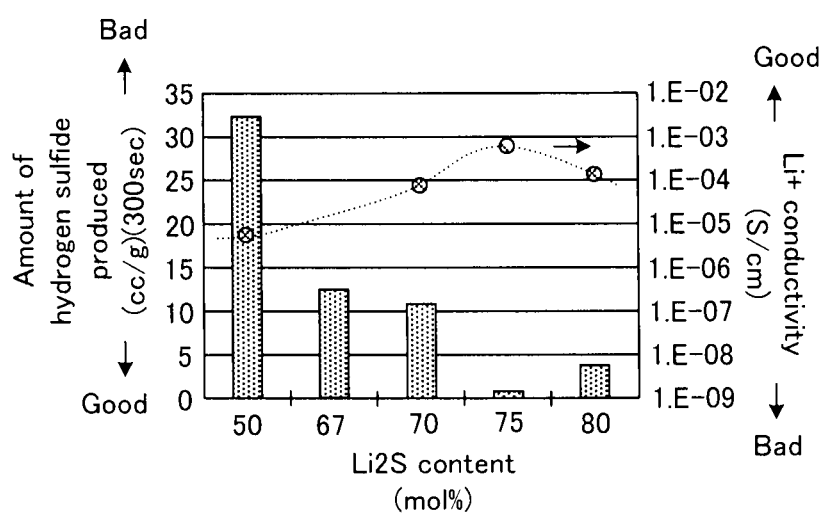
FIG. 4 is a graph showing a relation among $Li_2S$ content in the solid electrolyte layer of the all-solid-state lithium secondary battery provided for the battery system in the embodiment, amount of hydrogen sulfide produced, and $Li^+$ conductivity.
Figure 5:
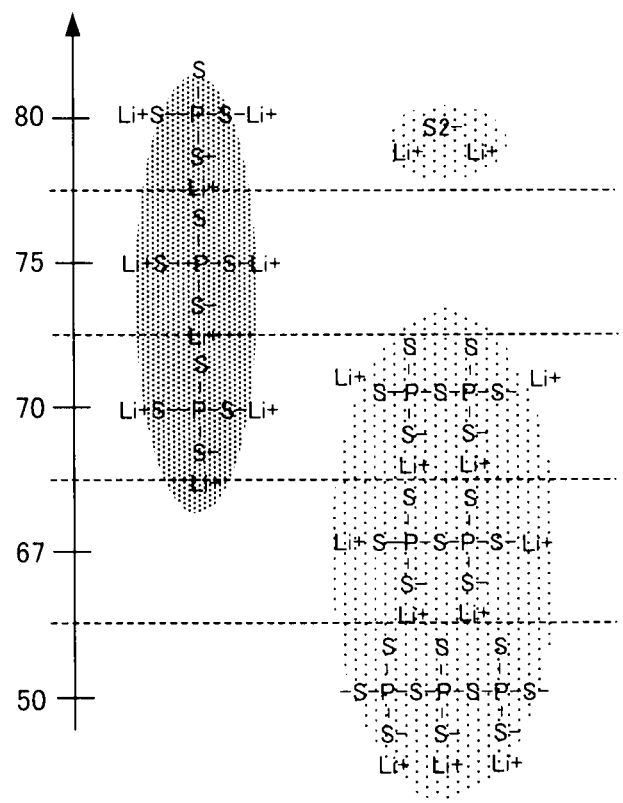
FIG. 5 is a schematic diagram showing the composition distribution of sulfide compounds with respect to the $Li_2S$ content in the solid electrolyte layer of the all-solid-state lithium secondary battery provided for the battery system in the embodiment.

Now, further with reference to FIG. 4 and FIG. 5, an explanation will be given on a relation among $Li_2S$ content in the solid electrolyte layer 33, amount of hydrogen sulfide produced, and $Li^+$ conductivity. FIG. 4 is a graph showing the relation among the $Li_2S$ content in the solid electrolyte layer 33, the amount of hydrogen sulfide produced, and the $Li^+$ conductivity, wherein the relation is obtained by experiments by the present inventors. Incidentally, the experimental results shown in FIG. 4 are obtained under room temperature. FIG. 5 is a schematic diagram showing the composition distribution of sulfide compounds with respect to the $Li_2S$ content.

Firstly, in focusing on the amount of hydrogen sulfide produced, as shown in FIG. 4, the amount of hydrogen sulfide produced has a minimal value near a $Li_2S$ content of 75 mol %. This means that it has been experimentally shown that the amount of hydrogen sulfide produced can be inhibited most by setting the $Li_2S$ content in the solid electrolyte layer 33 to be near 75 mol %. Incidentally, as the $Li_2S$ content deviates from near 75 mol %, the amount of hydrogen sulfide produced gradually increases.

On the other hand, in focusing on the $Li^+$ conductivity in the solid electrolyte layer 33, it is shown that the $Li^+$ conductivity has a maximal value near a $Li_2S$ content of 75 mol %. This means that the output power of the all-solid-stage lithium secondary battery 1 can be effectively increased by setting the $Li_2S$ content in the solid electrolyte layer 33 to be near 75 mol %. Incidentally, as the $Li_2S$ content deviates from near 75 mol %, the $Li^+$ conductivity gradually decreases, and the output power of the all-solid-stage lithium secondary battery 1 also decreases.

As described above, by setting the $Li_2S$ content in the solid electrolyte layer 33 to be near 75 mol %, it is possible to both inhibit the amount of hydrogen sulfide produced and increase the output power of the all-solid-stage lithium secondary battery 1 associated with an increase in the $Li^+$ conductivity. In the embodiment, by adopting the all-solid-stage lithium secondary battery 1 provided with the solid electrolyte layer 33, the battery system 100 with the large output power and with a less risk of producing hydrogen sulfide is realized.

Then, as shown in FIG. 5, it is found by the study of the present inventors that if the $Li_2S$ content in the solid electrolyte layer 33 is near 75 mol %, the compounds contained in the sulfide-based solid electrolyte material have ortho composition which is stable without cross-linked sulfur. Particularly in comparison with a $Li_2S$ content of 70 mol %, if the $Li_2S$ content is near 75 mol %, the amount of hydrogen sulfide produced is about $\frac{1}{50}$. This indicates that the possibility of producing hydrogen sulfide by a chemical reaction decreases because the solid electrolyte layer 33 formed with a $Li_2S$ content of near 75 mol % has the ortho composition which is materially stable without cross-linked sulfur. On the other hand, since the solid electrolyte layer 33 formed with a $Li_2S$ content of near 70 mol % has meta composition which is materially unstable without cross-linked sulfur, it is considered that a chemical reaction is easily caused and that the possibility of producing hydrogen sulfide increases.

Back in FIG. 3 again, the solid electrolyte layer 33 is, for example, a sulfide-based solid electrolyte material (Li-A-S) composed of Li, A, and S, and there is no limit as long as it is composed of a sulfide-based solid electrolyte material. In this case, A of Li-A-S is at least one type selected from a group consisting of P, Ge, B, Si and I. As the sulfide-based solid electrolyte material Li-A-S, specifically, $70Li_2S\text{-}30P_2S_5$, $LiGe_{0.25}P_{0.25}S_4$, $80Li_2S\text{-}20P_2S_5$, $Li_2S\text{—}SiS_2$, or the like can be listed. In particular, since $70Li_2S\text{-}30P_2S_5$ has a high ionic conductivity, it is preferable from the viewpoint that it can increase the output power of the all-solid-stage lithium secondary battery 1.

The positive electrode layer 34 can use the same material as what is used for a general all-solid-stage lithium secondary battery (i.e. what is used as a positive electrode active material in the battery field), and there is no limit as long as it functions as the positive electrode layer. For example, it may be composed only of a positive electrode material, or it may be composed of a positive electrode composite obtained by mixing the positive electrode material and the solid electrolyte material, or the like. Specifically, the positive electrode layer 34 may be formed from titanium sulfide ($TiS_2$), molybdenum sulfide ($MoS_2$), iron sulfide (FeS, $FeS_2$), copper sulfide (CuS), and nickel sulfide ($Ni_3S_2$), etc. in the sulfide-based material, bismuth oxide ($Bi_2O_3$), bismuth lead oxide ($Bi_2Pb_2O_5$), copper oxide (CuO), vanadium oxide ($V_6O_{13}$), lithium cobalt oxide ($LiCoO_2$), lithium nickel oxide ($LiNiO_2$), lithium manganese oxide($LiMnO_2$), etc. in an oxide-based material, or niobium selenide ($NbSe_3$) or the like. Moreover, they may be also mixed and used. Furthermore, in order to improve the conductive property, a conductive additive, such as acetylene black, Ketchen black, and carbon fiber, may be also contained.

Incidentally, regarding the film thickness of the positive electrode layer 34, there is no limit as long as it is the same as that of the positive electrode layer used for a general all-solid-stage lithium secondary battery. The negative electrode layer 35 can use the same material as what is used for a general all-solid-stage lithium secondary battery (i.e. what is used as a negative electrode active material in the battery field), and there is no limit as long as it functions as the negative electrode layer. For example, it may be composed only of a negative electrode material, or it may be composed of a negative electrode composite obtained by mixing the negative electrode material and the solid electrolyte material, or the like. Specifically, the negative electrode layer 35 may be formed, for example, from artificial graphite, graphite carbon fiber, resin-baked carbon, pyrolytic vapor grown carbon, cokes, mesocarbon microbead (MCMB), furfuryl alcohol resin based carbon, polyacene, pitch-based carbon fiber, vapor grown carbon fiber, natural graphite, and non-graphitizable carbon (preferably, from artificial graphite). Moreover, they may be also mixed and used. Furthermore, in order to improve the conductive property, the conductive additive, such as acetylene black, Ketchen black, and carbon fiber, may be also contained.

Moreover, as the negative electrode layer 35, metallic lithium, metallic indium, metallic aluminum, metallic silicon, and alloys obtained by combining those metals with other elements and compounds may be used.

Incidentally, regarding the film thickness of the negative electrode layer 35, there is no limit as long as it is the same as that of the negative electrode layer used for a general all-solid-stage lithium secondary battery.

Each of the positive electrode current collector 36 and the negative electrode current collector 37 has a function of collecting a current in respective one of the positive electrode layer 34 and the negative electrode layer 35, and it is formed from a conductive substance. As long as the same shall apply, there is no limit in the aspects of the positive electrode current collector 36 and the negative electrode current collector 37. The materials of the positive electrode current collector 36 and the negative electrode current collector 37 are preferably a plate-like body, a foil-like body or the like, which is composed, for example, of copper, magnesium, stainless steel, titanium, iron, cobalt, nickel, zinc, aluminum, germanium, indium, lithium, and their alloys, etc. Incidentally, the positive electrode current collector 36 and the negative electrode current collector 37 in the embodiment may be dense current collectors or porous current collectors.

Incidentally, the positive electrode current collector 36 and the negative electrode current collector 37 may also have the function of a battery case. For example, a battery case made of SUS (stainless steel) may be prepared, and one portion thereof may be used as the positive electrode current collector 36 and the negative electrode current collector 37.

As explained above, regarding the aspect of the all-solid-stage lithium secondary battery 1 in the battery system in the embodiment, there is no limit as long as it has at least the power generation element 31. Except for what is exemplified in FIG. 3, for example, the power generation element 31 may be covered by the battery case of a coin type, a laminate type, or the like. Alternatively, there may not be provided an insulating ring, the battery case, or the like for covering the power generation element.

Incidentally, even if the battery case 32 is damaged or in similar cases, in order not to produce hydrogen sulfide by directly exposing the electrolyte-containing layer containing the sulfide-based solid electrolyte material (i.e. the solid electrolyte layer 33, the positive electrode layer 34, and the negative electrode layer 35) to the air, an oxide layer may be formed to cover the surface of the electrolyte-containing layer. The oxide layer can be easily formed by performing an oxidation treatment on the surface of the electrolyte-containing layer. As described above, if the oxide layer is provided, it is possible to reduce the risk that the electrolyte-containing layer in the power generation element is directly exposed to moisture contained in the air or the like. Thus, it is possible to effectively inhibit the production of hydrogen sulfide. As a result, it is possible to realize the all-solid-stage lithium secondary battery which has excellent water resistance, high output power, and high stability.

Regarding the battery case 32, there is no limit as long as the same case as that of a general all-solid-stage lithium secondary battery is used. For the battery case 32, a case made of metal such as stainless steel is generally used.

Moreover, in order to prevent that the power generation element 31 is exposed to the air, the power element 31 is enclosed in the inside of the battery case 32, for example, by sealing the joint part of the battery case 32 with resin packing or the like. As the material of the resin packing, less absorbent resin or the like is preferable; for example, epoxy resin or the like is preferable.

Figure 6:
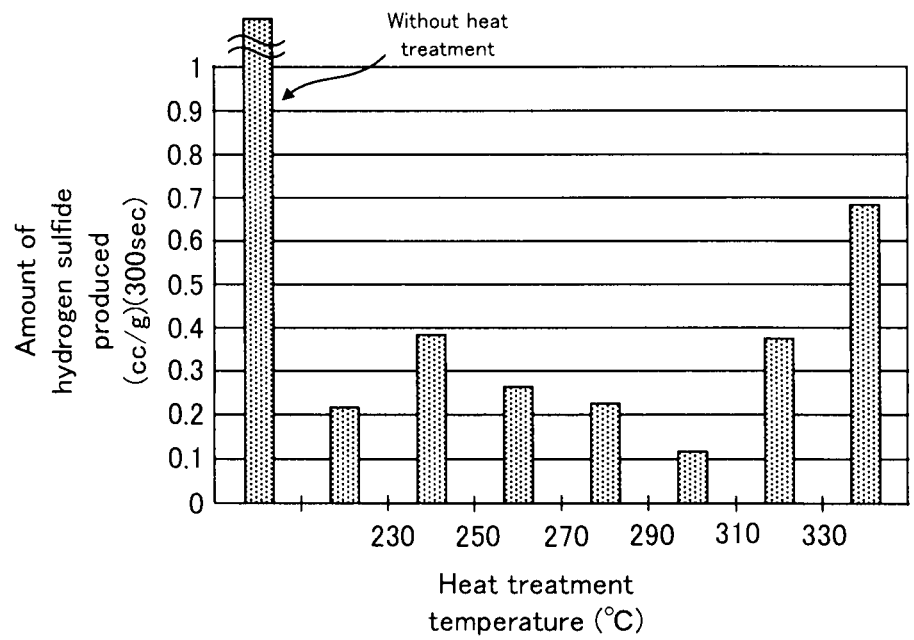
FIG. 6 is a graph showing a relation between heat treatment temperature and the amount of hydrogen sulfide produced, in a case where $Li_7P_3Si_{11}$ contained in the solid electrolyte layer of the all-solid-state lithium secondary battery provided for the battery system in the embodiment is exposed to high temperatures.

Next, with reference to FIG. 6, an explanation will be given on a relation between heat treatment temperature and the amount of hydrogen sulfide produced, in a case where $Li_7P_3S_{11}$ which is a sulfide-based material contained in the solid electrolyte layer 33 is exposed to high temperatures. FIG. 6 is a graph showing the relation between temperature and the amount of hydrogen sulfide produced, in a case where $Li_7P_3S_{11}$ which is the sulfide-based material contained in the solid electrolyte layer 33 is exposed to high temperatures for 300 seconds.

If $Li_7P_3S_{11}$ is not exposed to high temperatures (refer to the leftmost bar in FIG. 6), the amount of hydrogen sulfide produced significantly exceeds 1 cc/g, and in a case where it is exposed to moisture contained in the air or the like, a large amount of hydrogen sulfide is produced. On the other hand, if $Li_7P_3S_{11}$ is exposed to high temperatures (refer to each of the bars other than the leftmost bar in FIG. 6), the amount of hydrogen sulfide produced is less than 1 cc/g in each case, and even if it is exposed to moisture contained in the air or the like, the amount of hydrogen sulfide produced is inhibited. It is considered that this is because the exposure of $Li_7P_3S_{11}$ to high temperatures promotes crystallization.

If $Li_7P_3S_{11}$ is exposed to high temperatures (refer to each of the bars other than the leftmost bar in FIG. 6), the amount of hydrogen sulfide produced depends on the temperature to which $Li_7P_3S_{11}$ is exposed. Specifically, as shown in FIG. 6, if the temperature to which $Li_7P_3S_{11}$ is exposed increases from near 230 degrees C., the amount of hydrogen sulfide produced gradually decreases toward near 290 degrees C. It is considered that this is because the increase in temperature in the heat treatment promotes the crystallization of $Li_7P_3S_{11}$. On the other hand, the heat treat temperature exceeds near 290 degrees C., the amount of hydrogen sulfide produced changes to increase. It is considered that this is due to the precipitation of $Li_7P_3S_{11}$-rich crystals.

Since $Li_7P_3S_{11}$ which is the sulfide-based material contained in the solid electrolyte layer 33 has such characteristics, if the temperature of the solid electrolyte layer 33 exceeds 290 degrees C., the amount of hydrogen sulfide produced increases due to the precipitation of $Li_7P_3S_{11}$-rich crystals in the solid electrolyte layer 33. In order to prevent this situation, the battery system 100 in the embodiment is configured such that the switch 2 and the fuse 5 described above operate in preferable timing. Incidentally, the details of the control will be described later.

Incidentally, as $Li_7P_3S_{11}$ is exposed to high temperatures for longer period of time, the amount of hydrogen sulfide produced also decreases. For example, it is found from the experiments by the present inventors that if $Li_7P_3S_{11}$ is exposed to a temperature of 290 degrees C. for a sufficiently long time, the amount of hydrogen sulfide produced can be inhibited to about 1/10 in comparison with the case in FIG. 6 (i.e. the case where the time for the exposure to high temperatures is 300 seconds).

Figure 7:
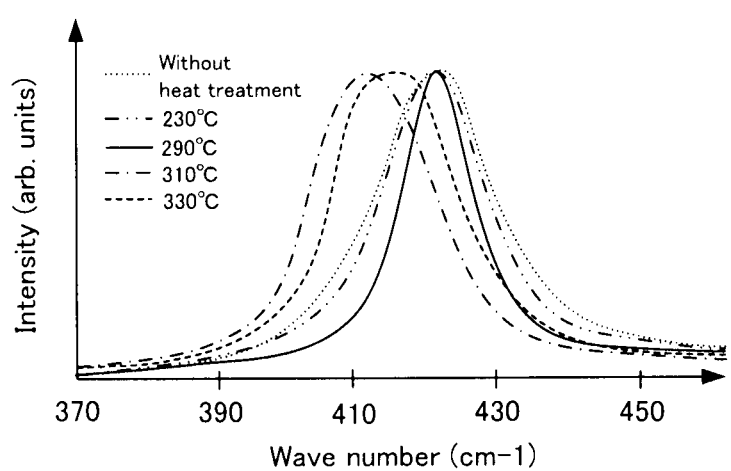
FIG. 7 is a graph showing the spectrum distribution of $Li_7P_3Si_{11}$ contained in the solid electrolyte layer of the all-solid-state lithium secondary battery provided for the battery system in the embodiment, which is exposed to different temperatures.

As described above, the fact that the amount of hydrogen sulfide produced can be effectively inhibited if $Li_7P_3S_{11}$ is exposed to high temperatures near 290 degrees C. can be also supported from the following experimental results by Raman measurement explained below. FIG. 7 is a graph showing the spectrum distribution of $Li_7P_3S_{11}$ which is exposed to a plurality of high temperatures.

In FIG. 7, in focusing on a wavelength component corresponding to $PS_4^{3-}$ which is materially stable (a component corresponding to a wave number of 420 $(cm^{-1})$ in FIG. 7), the data about $Li_7P_3S_{11}$ which is exposed to a high temperature of 290 degrees C. has the sharpest peak value. This fact shows that $Li_7P_3S_{ii}$ formed at a heat treatment temperature of 290 degrees C. has the largest amount of $PS_4^{3-}$ which is materially stable. As described above, it is shown even from the experimental results by Raman measurement that the amount of hydrogen sulfide produced can be effectively inhibited by limiting the temperature of the exposure of the solid electrolyte layer 33 to near 290 degrees C.

<2: Control of Embodiment>

Figure 8:
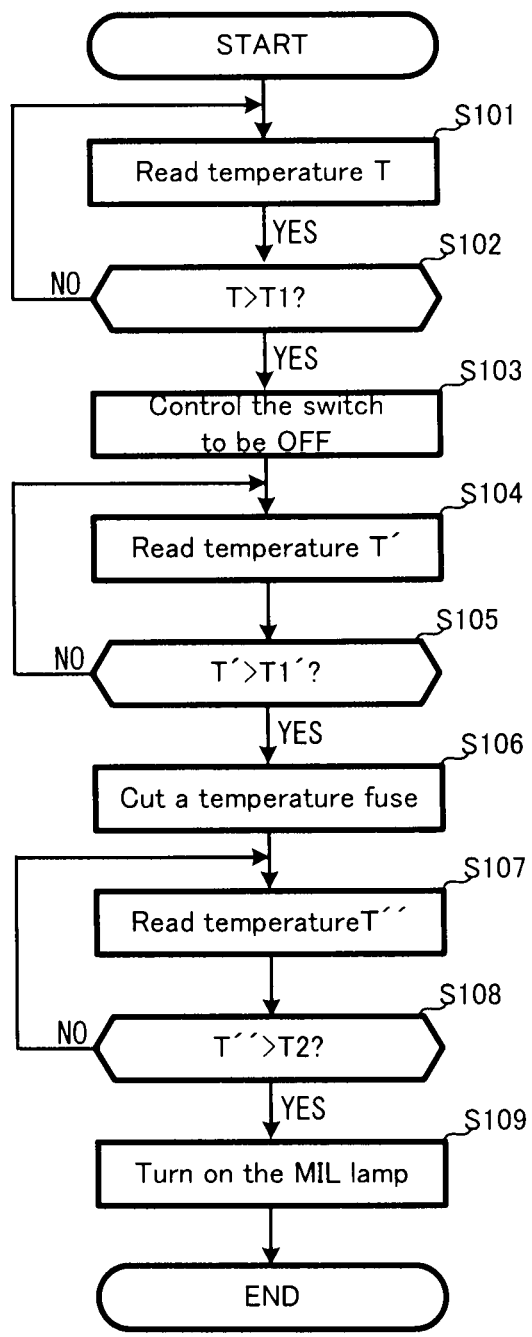
FIG. 8 is a flowchart showing battery protection control in the battery system in the embodiment.

Next, with reference to FIG. 8, the battery power control of the battery system 100 described above will be explained in detail. FIG. 8 is a flowchart showing the battery protection control in the battery system in the embodiment.

In FIG. 8, the battery protection circuit 2 reads the temperature T of the all-solid-state lithium secondary battery 1 (step S101) and judges whether or not the temperature T of the all-solid-state lithium secondary battery 1 is greater than a first temperature threshold value T1 (step S102). Here, the first temperature threshold value T1 is one example of the "first threshold value" of the present invention, and particularly in the embodiment, it is set to 290 degrees C. The temperature of 290 degrees C. is a temperature at which the amount of hydrogen sulfide produced is effectively inhibited in the case of the exposure of $Li_7P_3S_{11}$ contained in the all-solid-state lithium secondary battery 1, as described above (refer to FIG. 6).

If the temperature T of the all-solid-state lithium secondary battery 1 is lower than the first temperature threshold value T1 (the step S102: NO), the battery protection circuit 2 returns the process to the step S101 and reads the temperature T of the all-solid-state lithium secondary battery 1 again and then judges whether or not the temperature T is greater than the first temperature threshold value T1 (the step S102).

On the other hand, if the temperature T of the all-solid-state lithium secondary battery 1 is greater than the first temperature threshold value T1 (the step S102: YES), the battery protection circuit 2 controls the aforementioned switch 3 to be OFF in order to prevent that the temperature further increases due to the output/input of an excess current from the all-solid-state lithium secondary battery 1 (step S103). As described above, by operating the switch 3 on the basis of the first temperature threshold value T1, it is possible to prevent that the composition change in $Li_7P_3S_{11}$ contained in the solid electrolyte layer 33 increases a risk of producing hydrogen sulfide.

Then, the battery protection circuit 2 reads the temperature of the all-solid-state lithium secondary battery 1 again (step S104) and judges whether or not the read temperature T' of the all-solid-state lithium secondary battery 1 is greater than a temperature T1' (step S105). Here, the temperature T' is a temperature at which the fuse 5 blows out and which is a temperature value that the fuse 5 peculiarly has as a specification.

If the temperature T' of the all-solid-state lithium secondary battery 1 is lower than the temperature T1' (the step S105: NO), the process returns to the step S104 and the step S105 is performed again. On the other hand, if the temperature T' of the all-solid-state lithium secondary battery 1 is greater than the temperature T1' (the step S105: YES), the fuse 5 automatically blows out, by which the charge-discharge of the all-solid-state lithium secondary battery 1 is cut completely (step S106).

In other words, each step of the step S104 to the step S105 is actually performed not on the basis of the control of the battery protection circuit 2 but on the basis of the characteristics of the fuse 5; namely, if the temperature of the all-solid-state lithium secondary battery 1 exceeds the temperature T1', the fuse 5 automatically blows out, by which the charge-discharge of the all-solid-state lithium secondary battery 1 is cut completely. As described above, if it is not possible to suppress the increase in temperature of the all-solid-state lithium secondary battery 1 by controlling the switch 3 in the step S103, the fuse 5 is operated to cut the charge-discharge path of the all-solid-state lithium secondary battery 1. That is how to suppress the increase in temperature of the all-solid-state lithium secondary battery 1.

Incidentally, the temperature T1' at which the fuse 5 operates may be set to be equal to or slightly higher than the temperature T1 at which the switch 3 operates. In a case where the temperature T1' at which the fuse 5 operates is set to be higher than the first temperature threshold value T1, it is possible to operate the fuse 5 if the switch 3 cannot suppress the increase in temperature of the all-solid-state lithium secondary battery 1.

Then, the battery protection circuit 2 reads the temperature of the all-solid-state lithium secondary battery 1 again (step S107) and judges whether or not the read temperature T" of the all-solid-state lithium secondary battery 1 is greater than a second temperature threshold value T2 (step S108). Here, the second temperature threshold value T2 is one example of the "second threshold value", and it is set to be higher than the first temperature threshold value T1 which is one example of the "first threshold value" of the present invention.

If the temperature T" of the all-solid-state lithium secondary battery 1 is lower than the second temperature threshold value T2 (the step S108: NO), i.e. if it is confirmed that the increase in temperature of the all-solid-state lithium secondary battery 1 is effectively suppressed by the aforementioned control, then, the battery protection circuit 2 returns the process to the step S107, reads the temperature of the all-solid-state lithium secondary battery 1 again (the step S107), and performs the step S108.

On the other hand, if the temperature T" of the all-solid-state lithium secondary battery 1 is greater than the second temperature threshold value T2 (the step S108: YES), i.e. if the increase in temperature of the all-solid-state lithium secondary battery 1 is still not effectively suppressed in spite of the aforementioned control, then, the battery protection circuit 2 outputs the notification signal to light up the MIL lamp 4 (step S109). By the lighting-up of the MIL lamp 4, the user can recognize that there is the composition change in $Li_7P_3S_{11}$ contained in the solid electrolyte layer 33 of the all-solid-state lithium secondary battery 1.

Incidentally, once the temperature T' of the all-solid-state lithium secondary battery 1 exceeds the second temperature threshold value T2, if the user takes appropriate actions or the like, then, the battery protection circuit 2 keeps outputting the notification signal even if the temperature of the all-solid-state lithium secondary battery 1 becomes lower than or equal to the second temperature threshold value T. Thus, the MIL lamp 4 is kept lighting up. In other words, the lighting state of the MIL lamp 4 notifies the user of information indicating the fact that the temperature of the solid electrolyte layer 33 of the all-solid-state lithium secondary battery 1 reached the second temperature threshold value T2 in the past.

Incidentally, each of the first temperature threshold value T1 and the second temperature threshold value T described above is set in advance by various theoretical, experimental, or simulation methods and is stored in a not-illustrated storing device (e.g. a memory) attached to the battery.

As explained above, according to the battery system 100 in the embodiment, in the all-solid-state lithium secondary battery provided with the sulfide-based electrolyte-containing layer, it is possible to effectively inhibit the production of hydrogen sulfide.

INDUSTRIAL APPLICABILITY

The present invention can be installed, for example, to a hybrid vehicle and an electric vehicle provided with an electric motor which uses as a power source an electric power charged to or discharged from a battery. Moreover, the present invention can be used as the power supply of communication equipment, information-related equipment, or the like, such as a personal computer, a video camera, and a mobile phone.

DESCRIPTION OF REFERENCE CODES 1 all-solid-state lithium secondary battery
2 power protection circuit
3 switch
4 MIL lamp
5 fuse
20 temperature detection circuit
21 current detection circuit
22 voltage detection circuit
23 thermistor element
31 power generation element
32 battery case
33 solid electrolyte layer
34 positive electrode layer
35 negative electrode layer
36 positive electrode current collector
37 negative electrode current collector
100 battery system

The invention claimed is:

1. A battery system, comprising:
an all-solid-state lithium secondary battery (a) comprising a sulfide-comprising solid electrolyte material;
at least one reducing device (b); and
a signal outputting device (c),
wherein the at least one reducing device (b) reduces a charge-discharge amount of the all-solid-state lithium secondary battery (a) if a temperature in an inside of the all-solid-state lithium secondary battery (a) reaches a first threshold value,
wherein the signal outputting device (c) outputs a predetermined notification signal if the temperature in the inside of the all-solid-state lithium secondary battery (a) reaches a second threshold value, and
wherein the signal outputting device (c) continues outputting the predetermined notification signal if the temperature, after reaching the second threshold value, falls below the second threshold value.

2. The battery system of claim 1, wherein the at least one reducing device (b) comprises:
a switching device capable of selectively changing ON/OFF of an electrification state in a charge-discharge path of the all-solid-state lithium secondary battery (a); and
a controlling device,
wherein the controlling device controls the switching device such that the electrification state of the charge-discharge path is OFF if the temperature in the inside of the all-solid-state lithium secondary battery (a) reaches the first threshold value.

3. The battery system of claim 1, wherein the second threshold value is higher than the first threshold value.

4. The battery system of claim 1, wherein the at least one reducing device (b) reduces the charge-discharge amount by physically cutting a charge-discharge path of the all-solid-state lithium secondary battery (a) if the temperature in the inside of the all-solid-state lithium secondary battery (a) reaches the first threshold value.

5. The battery system of claim 1, wherein the temperature in the inside of the all-solid-state lithium secondary battery (a) is a temperature of the sulfide-comprising solid electrolyte material.

6. The battery system of claim 1, wherein the sulfide-comprising solid electrolyte material is $Li_7P_3S_{11}$ and the second threshold value is 290° C.

7. The battery system of claim 1, wherein the sulfide-comprising solid electrolyte comprises an oxide layer.

8. The battery system of claim 1, wherein the sulfide-comprising solid electrolyte material comprises at least one selected from the group consisting of S, Li, B, Si, Ge, P, and Al.

9. The battery system of claim 1, wherein the sulfide-comprising solid electrolyte material comprises Li, S, and at least one selected from a group consisting of P, Ge, B, Si and I.

10. The battery system of claim 1, wherein the sulfide-comprising solid electrolyte material comprises $70Li_2S\text{-}30P_2S_5$.

11. The battery system of claim 1, wherein the sulfide-comprising solid electrolyte material comprises $LiGe_{0.25}P_{0.75}S_4$.

12. The battery system of claim 1, wherein the sulfide-comprising solid electrolyte material comprises $80Li_2S\text{-}20P_2S_5$.

13. The battery system of claim 1, wherein the sulfide-comprising solid electrolyte material comprises $Li_2S\text{—}P_2S_5$.

14. The battery system of claim 1, wherein the all-solid-stage lithium secondary battery (a) comprises:
a solid electrolyte layer;
a positive electrode layer; and
a negative electrode layer.

15. The battery system of claim 14, wherein the positive electrode layer comprises at least one selected from the group consisting of $TiS_2$, $MoS_2$, FeS, $FeS_2$, CuS, $Ni_3S_2$, $Bi_2O_3$, $Bi_2Pb_2O_5$, CuO, $V_6O_{13}$, $LiCoO_2$, $LiNiO_2$, $LiMnO_2$, and $NbSe_3$.

16. The battery system of claim 14, wherein the negative electrode layer comprises at least one selected from the group consisting of artificial graphite, graphite carbon fiber, resin-baked carbon, pyrolytic vapor grown carbon, a coke, meso-carbon microbead (MCMB), carbon comprising furfuryl alcohol resin, polyacene, pitch-based carbon fiber, vapor grown carbon fiber, natural graphite, and non-graphitizable carbon.

17. The battery system of claim 14, wherein the negative electrode layer comprises at least one selected from the group consisting of metallic lithium, metallic indium, metallic aluminum, and metallic silicon.

* * * * *